US008546306B2

(12) United States Patent
Levy et al.

(10) Patent No.: US 8,546,306 B2
(45) Date of Patent: Oct. 1, 2013

(54) MICROCAPSULES COMPRISING A LIPOPHILIC SURFACTANT AND OIL

(75) Inventors: Tatjana Levy, Mannheim (DE); Marc Rudolf Jung, Worms (DE); Rainer Berghaus, Speyer (DE); Hans-Peter Hentze, Espoo (FI); Tobias Joachim Koplin, Ludwigshafen (DE); Jurith Montag, Limburgerhof (DE); Anke Reinold, Mannheim (DE); Christian Sowa, Neustadt (DE)

(73) Assignee: BASF SE, Ludwigshafen (DE)

( * ) Notice: Subject to any disclaimer, the term of this patent is extended or adjusted under 35 U.S.C. 154(b) by 178 days.

(21) Appl. No.: 12/865,756

(22) PCT Filed: Feb. 4, 2009

(86) PCT No.: PCT/EP2009/051272
§ 371 (c)(1),
(2), (4) Date: Aug. 2, 2010

(87) PCT Pub. No.: WO2009/098232
PCT Pub. Date: Aug. 13, 2009

(65) Prior Publication Data
US 2010/0323892 A1 Dec. 23, 2010

(30) Foreign Application Priority Data
Feb. 5, 2008 (EP) .................................. 08101289

(51) Int. Cl.
| | | |
|---|---|---|
| *A01N 25/28* | (2006.01) | |
| *A01N 63/00* | (2006.01) | |
| *A01N 65/00* | (2009.01) | |
| *A01N 25/02* | (2006.01) | |
| *A01N 25/16* | (2006.01) | |
| *A61K 9/16* | (2006.01) | |
| *A61K 9/50* | (2006.01) | |
| *C10L 1/16* | (2006.01) | |
| *C10L 5/00* | (2006.01) | |
| *C07C 9/00* | (2006.01) | |
| *C07C 11/00* | (2006.01) | |

(52) U.S. Cl.
USPC ........ 504/359; 504/116.1; 504/118; 504/189; 504/313; 504/320; 504/360; 504/361; 504/362; 504/363; 424/404; 424/405; 424/489; 424/490; 424/497; 424/498; 424/501; 585/10; 585/12; 585/18

(58) Field of Classification Search
USPC .............. 504/359, 116.1, 118, 189, 313, 320, 504/360, 361, 362, 363; 424/404, 405, 489, 424/490, 497, 498, 501; 585/10, 12, 18
See application file for complete search history.

(56) References Cited

U.S. PATENT DOCUMENTS

| 4,677,003 A | * | 6/1987 | Redlich et al. ................ 427/373 |
|---|---|---|---|
| 7,722,892 B2 | * | 5/2010 | Bell et al. ....................... 424/405 |
| 2003/0119675 A1 | * | 6/2003 | Wolf et al. ..................... 504/308 |
| 2005/0221991 A1 | | 10/2005 | Wolf et al. |
| 2007/0281860 A1 | | 12/2007 | Baur et al. |
| 2010/0008961 A1 | * | 1/2010 | Takeko ......................... 424/408 |
| 2010/0261839 A1 | | 10/2010 | Jung |
| 2010/0286018 A1 | | 11/2010 | Hentze et al. |

FOREIGN PATENT DOCUMENTS

| AU | B-76204/91 | | 11/1991 |
|---|---|---|---|
| AU | B-76204/91 | * | 7/1993 |
| DE | 100 58 878 | | 9/2010 |
| EP | 0 457 154 | | 11/1991 |
| WO | WO 03/099005 | | 12/2003 |
| WO | WO 2004/017733 | | 3/2004 |
| WO | WO 2004/017734 | | 3/2004 |
| WO | WO 2005/084435 | | 9/2005 |
| WO | WO 2009/077525 | | 6/2009 |
| WO | WO 2009/090169 | | 7/2009 |

OTHER PUBLICATIONS

International Search Report in International Application No. PCT/EP2009051272.
International Preliminary Report on Patentability in International Application No. PCT/EP2009/051272, filed Feb. 4, 2009.

* cited by examiner

*Primary Examiner* — Jane C Oswecki
(74) *Attorney, Agent, or Firm* — Brinks Hofer Gilson & Lione

(57) ABSTRACT

The invention relates to an aqueous dispersion comprising microcapsules, the capsule wall of which is formed from radically polymerized monomers and the capsule core of which comprises at least one oil, in which the capsule core comprises at least one lipophilic surfactant and the continuous phase of the dispersion comprises at least one agrochemical. In addition, the invention relates to a process for the preparation of an aqueous dispersion by (i) providing an aqueous dispersion comprising microcapsules, the capsule wall of which is formed from radically polymerized monomers and the capsule core of which comprises at least one oil and at least one lipophilic surfactant (microcapsule crude dispersion), and (ii) mixing with at least one agrochemical. Furthermore, the invention relates to the use of the microcapsule crude dispersion for the preparation of an aqueous dispersion, and also to a product comprising, as separate components, a microcapsule crude dispersion and at least one agrochemical for combined use in combating undesirable plant growth and/or in combating undesirable insect or acarid infestation on plants and/or in combating phytopathogenic fungi.

12 Claims, No Drawings

MICROCAPSULES COMPRISING A LIPOPHILIC SURFACTANT AND OIL

This application is a National Stage application of International Application No. PCT/EP2009/051272, filed Feb. 4, 2009, the entire contents of which is hereby incorporated herein by reference. This application also claims the benefit under 35 U.S.C. §119 of European Patent Application No. 08101289.0, filed Feb. 5, 2008, the entire contents of which is hereby incorporated herein by reference.

A subject matter of the present invention is an aqueous dispersion, the capsule wall of which is formed from radically polymerized monomers and the capsule core of which comprises at least one oil. An additional subject matter is a process for the preparation of the aqueous dispersion. An additional subject matter is the use of an aqueous dispersion comprising microcapsules, the capsule wall of which is formed from radically polymerized monomers and the capsule core of which comprises at least one oil and at least one lipophilic surfactant (microcapsule crude dispersion), for the preparation of an aqueous dispersion according to the invention. An additional subject matter is a product comprising, as separate components, a microcapsule crude dispersion and at least one agrochemical for combined use in the combating of undesirable plant growth and/or for combating undesirable insect or acarid infestation on plants and/or for combating phytopathogenic fungi. Finally, another subject matter is a use in combating undesirable plant growth and/or in combating undesirable insect or acarid infestation on plants and/or in combating phytopathogenic fungi. Additional subject matters of the present invention can be inferred from the claims and the examples.

Combinations of preferred characteristics with other preferred characteristics are comprised within the present invention.

Microcapsules have been described for various industrial applicational purposes in various configuration forms. Microcapsules based on gelatin, polyurethane resin, melamine/formaldehyde resin and polyacrylates are known.

Microcapsules based on polyacrylate are especially known to a person skilled in the art as particularly stable configuration form. For example, polyacrylate-comprising microcapsules are used to protect core materials which are only to be released through selective mechanical destruction of the capsule envelope, for example colorants for copy paper. An additional commercial example are polyacrylate-comprising microcapsules for protecting core materials which are to remain encapsulated for several decades, such as microencapsulated latent heat storage materials for concrete or gypsum plasterboard.

EP 0 457 154 relates to microcapsules which can be obtained by polymerization of acrylic monomers. Suitable ingredients include, in addition to color formers for copy paper, fragrances, adhesives, agricultural chemicals, foodstuffs, liquid crystals and catalysts, also detergents and oils.

WO 03/099005 relates to microcapsule formulations which, in addition to an aqueous suspension of a solid agrochemical active compound, also comprise microcapsules comprising an envelope made of polyurea and/or polyurethane and, as capsule filling, at least one penetration promoter. Suitable penetration promoters are, inter alia, oils and alkanol alkoxylates.

WO 04/017734 relates to aqueous dispersions of microencapsulated agrochemicals. The capsules comprise an agrochemical, a water-insoluble adjuvant with little or no surface-active effect and a water-insoluble solvent. The capsule contents are released from the formulation on drying.

DE 102007055813 relates to microcapsules which can be obtained by polymerization of acrylic monomers. Lipophilic substances are suitable as capsule core.

US 2003/0119675 A1 relates to an aqueous microcapsule suspension, the envelope of which is a reaction product of an isocyanate with a di- or polyamine, and which are filled with an agrochemical active compound, a hydrocarbon and a surfactant.

DE 100 58 878 A1 relates to an aqueous microcapsule suspension, the envelope of which is a reaction product of an isocyanate with a di- or polyamine, and which are filled with an agrochemical active compound, a hydrocarbon and a surfactant.

Microcapsules comprising polyurethanes are disadvantageous in comparison with microcapsules with radically polymerized monomers since poisonous isocyanates are used as monomers for polyurethanes, which monomers have to be handled with a high level of safety measures. Furthermore, isocyanates are highly reactive with regard to groups comprising acidic H, such as alcohols and amines, so that, during the polyaddition, only well chosen additives, surfactants or oils may be present. Furthermore, a relatively high temperature must be used for the dispersing of some surfactants or oils, so that the reactivity of the isocyanates is yet increased.

It was an object of the present invention to find an opportunity to increase the stability of suspension concentrates, which stability may be reduced by adjuvants.

An additional object was to provide aqueous dispersions of microcapsules for agrochemical use which comprise penetration-promoting compounds, such as oil or lipophilic surfactant, and can rerelease.

In addition, it was an object to provide suspension concentrates of plant protection agents comprising penetration-promoting compounds, such as oil or lipophilic surfactant, in which the crystallization of the active compound crystals is reduced.

An additional object was to provide suspension concentrates of plant protection agents which showed an increased biological activity in comparison with conventional suspension concentrates without added adjuvant.

An additional object was to provide aqueous dispersions of microcapsules for agrochemical use, which can be prepared without isocyanates.

The object was achieved through an aqueous dispersion comprising microcapsules, the capsule wall of which is formed from radically polymerized monomers and the capsule core of which comprises at least one oil, in which the capsule core comprises at least one lipophilic surfactant and the continuous phase of the dispersion comprises at least one agrochemical.

The term "aqueous dispersion" is understood to mean, in the present patent application, a system of several phases, the continuous phase of which is aqueous and at least one additional phase of which is finely divided. The continuous phase of the aqueous dispersion comprises, according to the invention, at least one agrochemical. The agrochemical can in this connection be present in the continuous phase at 25° C. in solid, liquid or solid and liquid form. Preferably, the continuous phase of the dispersion comprises, at 25° C., at least one agrochemical in the form of suspended (i.e. solid) particles.

A microcapsule of the aqueous dispersion according to the invention comprises a capsule wall and a capsule core. According to the invention, a microcapsule is also to be understood which comprises at least one capsule wall and at least one capsule core. Thus, a microcapsule can, for example, exhibit one capsule core and two capsule walls. Likewise, a microcapsule can, for example, exhibit several capsule cores, for example two capsule cores next to one another or one within the other, and one capsule wall, for example two capsule walls next to one another or one within the other. Preferably, a microcapsule comprises one capsule wall and one capsule core.

The process according to the invention generally results in microcapsules which are identical or similar in construction. Since the process according to the invention produces an ensemble of microcapsules, a few individual microcapsules may differ in their structure and, for example, may not comprise a capsule core. Preferably, essentially all, in particular all, microcapsules comprise a capsule wall and a capsule core.

The mean particle size of the capsules (Z-mean by means of light scattering) is from 0.5 to 100 µm, preferably from 0.8 to 50 µm and in particular from 1 to 20 µm.

The ratio by weight of capsule core to capsule wall is generally from 50:50 to 99:1. A core/wall ratio of 70:30 to 98:2, in particular of 80:20 to 95:5, is preferred. The ratio by weight of capsule core to capsule wall is calculated from the ratio of the sum of oil and lipophilic surfactant to the sum of the monomers.

The capsule wall is formed from radically polymerized monomers. Generally, a person skilled in the art understands the term "radically polymerized monomers" to mean those monomers which, through radical chain reaction of monomers, became polymerized to form a polymer. A person skilled in the art usually distinguishes radically polymerized monomers, for example, from monomers which become polymerized by polycondensation to give polyesters or by polyaddition to give polyurethanes. Preferred radically polymerized monomers are acrylic acid and its esters, methacrylic acid and its esters, maleic acid and its esters, styrene, butadiene, isoprene, vinyl acetate and vinyl propionate. Alkyl acrylate, alkyl methacrylate, acrylic acid, methacrylic acid, 1,4-butanediol diacrylate, methacrylic anhydride, pentaerythrityl tetraacrylate, pentaerythrityl triacrylate and trimethylolpropane triacrylate are particularly preferred.

In a preferred embodiment, the capsule wall is formed from 30 to 100% by weight of one or more monomers which are
$C_1$-$C_{24}$-alkyl esters of acrylic acid, $C_1$-$C_{24}$-alkyl esters of methacrylic acid, acrylic acid, methacrylic acid, methacrylic anhydride and maleic acid (monomer I),
0 to 20% by weight of one or more bi- and/or polyfunctional monomers (monomers II) which are insoluble or sparingly soluble in water, and
0 to 50% by weight of one or more other monomers (monomers III),
in each case based on the total weight of the monomers.

The polymers of the capsule wall generally comprise, copolymerized, at least 30% by weight, in preferred form at least 40% by weight, in particularly preferred form at least 50% by weight, in particular at least 60% by weight, very particularly preferably at least 65% by weight, and also up to 100% by weight, of one or more monomers I, based on the total weight of the monomers.

In addition, the polymers of the capsule wall can generally comprise, copolymerized, up to 20% by weight, preferably at most 15% by weight and in particularly preferred form at most 10% by weight of at least one monomer II. In a preferred embodiment, the polymers of the capsule wall cannot comprise any monomer II copolymerized. In an additional preferred embodiment, the polymers of the capsule wall can comprise, copolymerized, from 0.1 to 20% by weight, preferably from 0.5 to 10% by weight, of monomers II.

In addition, the polymers of the capsule wall can comprise, copolymerized, up to 50% by weight, preferably up to 40% by weight, in particular up to 20% by weight, of at least one other monomer III. In a preferred embodiment, the polymers of the capsule wall can comprise no copolymerized monomer III. In an additional preferred embodiment, the polymers of the capsule wall can comprise, copolymerized, from 1 to 50% by weight, preferably from 5 to 40% by weight, of monomers III.

In a preferred embodiment, the capsule wall is formed from the monomers of groups I, II and III. In an additional preferred embodiment, the capsule wall is formed from the monomers of groups I and II. In an additional preferred embodiment, the capsule wall is formed from the monomers of groups I and III. In an additional preferred embodiment, the capsule wall is formed from the monomers of group I.

The $C_1$-$C_{24}$-alkyl esters of acrylic acid and/or methacrylic acid and methacrylic anhydride are suitable as monomers I. Furthermore, unsaturated $C_3$- and $C_4$-carboxylic acids, such as acrylic acid, methacrylic acid and maleic acid, are suitable. Mention may be made, by way of example, of methyl acrylate, ethyl acrylate, n-propyl acrylate, isopropyl acrylate, n-butyl acrylate, isobutyl acrylate, sec-butyl acrylate and tert-butyl acrylate and also methyl methacrylate, ethyl methacrylate, n-propyl methacrylate, isopropyl methacrylate, n-butyl methacrylate, isobutyl methacrylate, sec-butyl methacrylate and tert-butyl methacrylate. Alkyl acrylate, alkyl methacrylate, acrylic acid, methacrylic acid and methacrylic anhydride are preferred.

Suitable monomers II are bi- or polyfunctional monomers which are insoluble or sparingly soluble in water. Preferably, however, monomers II have a good to limited solubility in the lipophilic substance. The term "sparingly soluble" is understood to mean a solubility of less than 60 g/l in water at 20° C. The term "bi- or polyfunctional monomers" is understood to mean compounds having at least two nonconjugated ethylenic double bonds. Especially suitable are divinyl and polyvinyl monomers which bring about crosslinking of the capsule wall during the polymerization.

Preferred divinyl monomers are the diesters of diols with acrylic acid or methacrylic acid and also the diallyl and divinyl ethers of these diols. Mention may be made, by way of example, of ethanediol diacrylate, ethylene glycol dimethacrylate, 1,3-butylene glycol dimethacrylate, methallylmethacrylamide, allyl acrylate and allyl methacrylate. Particular preference is given to propanediol, butanediol, pentanediol and hexanediol diacrylate and the corresponding methacrylates.

Suitable polyvinyl monomers are, for example, divinylbenzene, trivinylbenzene and divinylcyclohexane and trivinylcyclohexane. Preferred polyvinyl monomers are the polyesters of polyols with acrylic acid and/or methacrylic acid and also the polyallyl and polyvinyl ethers of these polyols. Preference is given to trimethylolpropane triacrylate and methacrylate, pentaerythrityl triallyl ether, pentaerythrityl tetraallyl ether, pentaerythrityl triacrylate and pentaerythrityl tetraacrylate or the corresponding methacrylates and also their technical mixtures.

Suitable as other monomers III are monoethylenically unsaturated monomers other than the monomers I. Preference is given to monomers IIIa, such as vinyl acetate, vinyl propionate and vinylpyridine, styrene, vinyl chloride or vinylidene dichloride. In an additional preferred embodiment, the water-soluble monomers IIIb are suitable, e.g. acrylonitrile, methacrylamide, itaconic acid, maleic anhydride, N-vinylpyrrolidone, 2-hydroxyethyl acrylate, 2-hydroxyethyl methacrylate and acrylamido-2-methylpropanesulfonic acid. In addition, mention may in particular be made of N-methylolacrylamide, N-methylolmethacrylamide, dimethylaminoethyl methacrylate and diethylaminoethyl methacrylate.

The capsule core comprises at least one lipophilic surfactant and at least one oil.

The term "surfactants" is to be understood as meaning amphiphilic compounds with at least one hydrophobic portion of a molecule and at least one hydrophilic portion of a molecule. Surfactants have the property of reducing the surface tension between two phases.

Suitable as lipophilic surfactants according to the invention are surfactants which are dissolved to at least 90% by weight, preferably to at least 95% by weight and in particular to at least 99% by weight, at 20° C., in the oil or the mixture of oils which are present in the capsule core. In a preferred embodiment, suitable surfactants are those which are dissolved to at least 70% by weight, preferably to at least 80% by weight and in particular to at least 90% by weight, at 60° C., in the oil or the mixture of oils which are present in the capsule core. The solubility in oil of the surfactant is determined at a ratio by weight of lipophilic surfactant to oil corresponding to the ratio by weight in the capsule core.

Preferred lipophilic surfactants are nonionic surfactants, such as alkanol alkoxylates, alkylphenol polyglycol ethers, ethoxylated sorbitan fatty acid esters, alkylpolyglucosides, fatty acid glucamides, fatty acid polyglycol esters, fatty alcohols, fatty amine alkoxylates, fatty acid amide alkoxylates, polyglycerol fatty acid esters, fatty acid alkanolamides or ethylene oxide/propylene oxide block polymers.

Preferred nonionic surfactants are alkanol alkoxylates and ethylene oxide/propylene oxide block polymers, in particular alkanol alkoxylates. Furthermore, mixtures of the abovementioned lipophilic surfactants are preferred.

Preferred alkanol alkoxylates are those of the formula (I)

$$R^a\text{—O-}(AO)_m\text{—}R^1 \qquad \text{formula (I)}$$

in which
$R^a$ is straight-chain or branched alkyl or alkylene with from 4 to 32, preferably from 10 to 22, carbon atoms,
AO is an ethylene oxide radical, propylene oxide radical, butylene oxide radical, pentylene oxide radical, styrene oxide radical or mixtures of the abovementioned radicals in random or block sequence,
m is numbers from 1 to 30 and
$R^1$ is hydrogen or alkyl with from 1 to 4 carbon atoms.

Particularly preferred alkanol alkoxylates are those of the formula (II)

$$R^b\text{—O-}(EO)_p\text{—}(PO)_q\text{—}R^1 \qquad \text{formula (II)}$$

in which
$R^b$ is straight-chain or branched alkyl or alkylene with from 4 to 32, preferably from 10 to 22, particularly preferably from 6 to 18, carbon atoms,
EO is —CH$_2$CH$_2$—O—,
PO is —CH$_2$—CH(CH$_3$)—O— or —(CH$_2$)$_3$—O—,
p is numbers from 0 to 20, preferably from 3 to 10, in particular from 4 to 8,
q is numbers from 1 to 25, preferably from 4 to 15, and
$R^1$ is hydrogen or alkyl with from 1 to 4 carbon atoms,
in which the EO and PO units can occur in random sequence or as blocks.

In an additional embodiment, with the alkanol alkoxylate of the formula (II),
$R^b$ is straight-chain or branched alkyl or alkylene with from 4 to 32, preferably from 6 to 22, particularly preferably from 10 to 18, carbon atoms,
q is numbers from 1 to 25, preferably from 3 to 15,
and the other radicals as described above for the formula (II).

An additional particularly preferred embodiment are alkanol alkoxylates of the formula (III)

$$R^c\text{—O-}(EO)_p\text{—}(BO)_q\text{—}R^1 \qquad \text{formula (III)}$$

in which
$R^c$ is straight-chain or branched alkyl or alkylene with from 4 to 32, preferably from 7 to 18, carbon atoms,
EO is —CH$_2$CH$_2$—O—,
BO is —C$_4$H$_8$O—, which can be linear or branched,
p is numbers from 1 to 25, preferably from 3 to 12, in particular from 4 to 7,
q is numbers from 1 to 25, preferably from 1 to 15, in particular from 1 to 7, and
$R^1$ is hydrogen or alkyl with from 1 to 4 carbon atoms,
in which the EO and BO units can occur in random sequence or as blocks.

An additional particularly preferred embodiment are alkanol alkoxylates of the formula (IV)

$$R^d\text{—O-}(EO)_p\text{—}R^1 \qquad \text{formula (IV)}$$

in which
$R^d$ is straight-chain or branched alkyl or alkylene with from 4 to 32, preferably from 10 to 15, carbon atoms,
EO is —CH$_2$CH$_2$—O—,
p is numbers from 1 to 10, preferably from 1 to 3,
$R^1$ is hydrogen or alkyl with from 1 to 4 carbon atoms.

Compounds which are suitable as oils are, for example, aliphatic compounds, aromatic compounds, waxes, vegetable oils, esters of vegetable oils, silicone oils, aliphatic C$_6$-C$_{18}$ alcohols, fatty acid esters with from 8 to 40 carbon atoms in the acid portion and from 1 to 20 carbon atoms in the alcohol portion, preferably ethylhexyl laurate, or dialkyl esters of the formula (V)

$$R^2\text{—O(O)}R^3\text{(O)O—}R^4 \qquad \text{formula (V)}$$

in which
$R^2$ and $R^4$, are, independently of one another, an alkyl or alkylene with from 1 to 32, preferably from 2 to 26, especially from 4 to 22, carbon atoms,
O(O)R$^3$(O)O is a dicarboxyl radical in which R$^3$ comprises at least 3, preferably from 4 to 8, carbon atoms. Preferred dialkyl esters are dibutyl succinate, dibutyl adipate and dibutyl phthalate. Mixtures of the abovementioned oils are also suitable.

Examples of vegetable oils and esters of vegetable oils are rapeseed oil, soybean oil, palm oil, sunflower oil, corn oil, linseed oil, colza oil, olive oil, cottonseed oil, rapeseed oil methyl ester, rapeseed oil ethyl ester and mixtures of vegetable oils, of esters of vegetable oils or of both.

Examples of aromatic compounds are benzene, toluene, xylene, naphthalene, biphenyl, o- or m-terphenyl, aromatic hydrocarbons substituted with one or more C$_1$-C$_{20}$-alkyl groups, such as dodecylbenzene, tetradecylbenzene, hexadecylbenzene, methylnaphthalene, diisopropylnaphthalene, hexylnaphthalene or decylnaphthalene. Technical mixtures of aromatic compounds in the boiling-point range from 30 to 250° C. and also mixtures of the abovementioned aromatic compounds are also suitable. Preferred aromatic compounds are technical mixtures of aromatic compounds in the boiling-point range from 30 to 250° C.

Examples of aliphatic compounds are saturated or unsaturated C$_{10}$-C$_{40}$-hydrocarbons which are branched or, preferably, linear, e.g. such as n-tetradecane, n-pentadecane, n-hexadecane, n-heptadecane, n-octadecane, n-nonadecane, n-eicosane, n-heneicosane, n-docosane, n-tricosane, n-tetracosane, n-pentacosane, n-hexacosane, n-heptacosane, n-octacosane, cyclic hydrocarbons, e.g. cyclohexane, cyclooctane or cyclodecane, mineral oils comprising saturated hydrocarbons, or high-pressure-hydrogenated mineral oil ("white mineral oils"). Mixtures of the abovementioned aliphatic compounds are also suitable. Mineral oils are preferred as aliphatic compounds.

Examples of waxes are natural and synthetic waxes, such as montanic acid waxes, montanic ester waxes, carnauba wax, polyethylene wax, oxidized waxes, polyvinyl ether waxes, ethylene/vinyl acetate wax and mixtures of the abovementioned waxes. Preference is given to low-melting waxes, in particular to those which are liquid at 30 to 100° C., in particular at 35 to 70° C.

Examples of aliphatic $C_6$-$C_{18}$ alcohols are branched or linear $C_6$-$C_{18}$ alcohols, preferably $C_8$-$C_{14}$ alcohols, with a primary, secondary or tertiary hydroxyl group. The solubility in water of the aliphatic $C_6$-$C_{18}$ alcohol is preferably less than 10 g/l at 20° C. Suitable examples of aliphatic $C_6$-$C_{18}$ alcohols are n-decanol, n-undecanol and n-dodecanol. Dodecanol is preferred.

Preferred oils are aromatic compounds, aliphatic compounds, vegetable oils and esters of vegetable oils, each individually or in a mixture. Particularly preferred oils are vegetable oils and aliphatic compounds, each individually or in a mixture.

Generally, the oil is present in the capsule core in a liquid and/or solid form, depending on the melting point and the ambient temperature. With an ambient temperature of 20° C., the oil is preferably present in liquid form in the capsule core.

Preference is given to those combinations of lipophilic surfactant and oil which exhibit a penetration-promoting effect.

Suitable as combinations with a penetration-promoting effect in the present connection are all those substances which are normally used to improve the penetration of agrochemical active compounds into plants. Penetration promoters are in this connection defined in this way, that they penetrate from the aqueous spray mixture and/or from the spray coating into the cuticle of the plant and, through this, can increase the mobility of active compounds in the cuticle. The method of unilateral desorption described in the literature (Baur et al., 1997, Pesticide Science 51, 131-152) can be used to determine this property. An additional suitable method consists in leaving, on a leaf, an individual drop of the mixture to be investigated and determining the residue on the leaf after several days.

Preferred combinations of lipophilic surfactant and oil with a penetration-promoting effect are, for example, combinations of in each case at least one nonionic surfactant with in each case at least one aromatic compound, and/or aliphatic compound, and/or vegetable oil, and/or ester of vegetable oils, and/or silicone oils and/or wax. In an additional embodiment, the combination of each time at least one nonionic surfactant with each time at least one aromatic compound and/or aliphatic compound, and/or vegetable oil, and/or ester of vegetable oils, and/or silicone oils, and/or wax and/or aliphatic $C_6$-$C_{18}$ alcohol is preferred.

Particular preference is given to combinations of alkanol alkoxylates and aromatic compounds, alkanol alkoxylates and aliphatic compounds, alkanol alkoxylates and vegetable oils, alkanol alkoxylates and esters of vegetable oils, and alkanol alkoxylates and waxes. In a preferred embodiment, the combination of alkanol alkoxylates and aliphatic $C_6$-$C_{18}$ alcohol is particularly preferred.

Preference is very particularly given to combinations of at least one alkanol alkoxylate of the formula (II) with at least one aromatic compound, at least one alkanol alkoxylate of the formula (II) with at least one aliphatic compound, at least one alkanol alkoxylate of the formula (II) with at least one vegetable oil, and at least one alkanol alkoxylate of the formula (II) with at least one ester of vegetable oil.

In an additional embodiment, the combination of at least one alkanol alkoxylate of the formula (II) with at least one aliphatic $C_6$-$C_{18}$ alcohol is very particularly preferred.

According to a particularly preferred embodiment, at least one alkanol alkoxylate of the formula (II) is used as lipophilic surfactants and at least one vegetable oil or at least one mineral oil is used as oil. In an additional particularly preferred embodiment, at least one alkanol alkoxylate of the formula II is used as lipophilic surfactants and at least one vegetable oil or at least one aliphatic $C_6$-$C_{18}$ alcohol is used as oil.

The capsule core generally comprises more than 10% by weight, preferably more than 15% by weight, in particular more than 20% by weight and very particularly more than 25% by weight of at least one lipophilic surfactant and less than 90% by weight, preferably less than 85% by weight, in particular less than 80% by weight and very particularly less than 75% by weight of at least one oil, in each case based on the capsule core.

In an additional embodiment, the capsule core comprises more than 10 to 90% by weight, preferably from 15 to 85% by weight, in particular from 20 to 80% by weight and very particularly from 25 to 75% by weight of at least one lipophilic surfactant and more than 10 to 90% by weight, preferably from 15 to 85% by weight, in particular from 20 to 80% by weight and very particularly from 25 to 75% by weight of at least one oil, in each case based on the capsule core.

Preferred combinations of lipophilic surfactant and oil in amounts with a penetration-promoting effect are, for example, more than 10% by weight of at least one nonionic surfactant and less than 90% by weight of at least one aromatic compound, more than 10% by weight of at least one nonionic surfactant and less than 90% by weight of at least one aliphatic compound, more than 10% by weight of at least one nonionic surfactant and less than 90% by weight of at least one vegetable oil, more than 10% by weight of at least one nonionic surfactant and less than 90% by weight of at least one ester of vegetable oils, and more than 10% by weight of at least one nonionic surfactant and less than 90% by weight of at least one wax, in each case based on the capsule core. In an additional embodiment, preferred combinations of lipophilic surfactant and oil in amounts with a penetration-promoting effect are, for example, more than 10% by weight of at least one nonionic surfactant and less than 90% by weight of at least one aliphatic $C_6$-$C_{18}$ alcohol.

Particularly preferred are combinations in amounts of more than 10% by weight of at least one alkanol alkoxylate and less than 90% by weight of at least one aromatic compound, more than 10% by weight of at least one alkanol alkoxylate and less than 90% by weight of at least one aliphatic compound, more than 10% by weight of at least one alkanol alkoxylate and less than 90% by weight of at least one vegetable oil, more than 10% by weight of at least one alkanol alkoxylate and less than 90% by weight of at least one ester of vegetable oils, and more than 10% by weight of at least one alkanol alkoxylate and less than 90% by weight of at least one wax. An additional particularly preferred embodiment are combinations in amounts of more than 10% by weight of at least one alkanol alkoxylate and less than 90% by weight of at least one aliphatic $C_6$-$C_{18}$ alcohol.

Very particularly preferred are combinations of amounts of more than 10% by weight of at least one alkanol alkoxylate of the formula (II) with less than 90% by weight of at least one aromatic compound, more than 10% by weight of at least one alkanol alkoxylate of the formula (II) with less than 90% by weight of at least one aliphatic compound, more than 10% by weight of at least one alkanol alkoxylate of the formula (II) with less than 90% by weight of at least one vegetable oil, and more than 10% by weight of at least one alkanol alkoxylate of the formula (II) with less than 90% by weight of at least one ester of vegetable oils. An additional very particularly preferred embodiment are combinations in amounts of more than 10% by weight of at least one alkanol alkoxylate of the formula (II) with less than 90% by weight of at least one aliphatic $C_6$-$C_{18}$ alcohol.

Preferred combinations of lipophilic surfactant and oil are furthermore from 30 to 90% by weight of at least one nonionic surfactant and from 70 to 10% by weight of at least one aromatic compound, from 30 to 90% by weight of at least one nonionic surfactant and from 70 to 10% by weight of at least one aliphatic compound, from 30 to 90% by weight of at least one nonionic surfactant and from 70 to 10% by weight of at least one vegetable oil, from 30 to 90% by weight of at least one nonionic surfactant and from 70 to 10% by weight of at least one ester of vegetable oils, and from 30 to 90% by weight of at least one nonionic surfactant and from 70 to 10% by weight of at least one wax, each time based on the capsule core. An additional preferred embodiment are combinations of lipophilic surfactant and oil of from 30 to 90% by weight of at least one nonionic surfactant and from 70 to 10% by weight of at least one aliphatic $C_6$-$C_{18}$ alcohol.

Particularly preferred are combinations in amounts of from 30 to 90% by weight of at least one alkanol alkoxylate and from 70 to 10% by weight of at least one aromatic compound, from 30 to 90% by weight of at least one alkanol alkoxylate and from 70 to 10% by weight of at least one aliphatic compound, from 30 to 90% by weight of at least one alkanol alkoxylate and from 70 to 10% by weight of at least one vegetable oil, from 30 to 90% by weight of at least one alkanol alkoxylate and from 70 to 10% by weight of at least one ester of vegetable oils, and from 30 to 90% by weight of at least one alkanol alkoxylate and from 70 to 10% by weight of at least one low-melting wax. An additional particularly preferred embodiment are combinations in amounts of from 30 to 90% by weight of at least one alkanol alkoxylate and from 70 to 10% by weight of at least one aliphatic $C_6$-$C_{18}$ alcohol.

Very particularly preferred are combinations in amounts of from 30 to 90% by weight of at least one alkanol alkoxylate of the formula (II) with from 70 to 10% by weight of at least one aromatic compound, from 30 to 90% by weight of at least one alkanol alkoxylate of the formula (II) with from 70 to 10% by weight of at least one aliphatic compound, from 30 to 90% by weight of at least one alkanol alkoxylate of the formula (II) with from 70 to 10% by weight of at least one vegetable oil, and from 30 to 90% by weight of at least one alkanol alkoxylate of the formula (II) with from 70 to 10% by weight of at least one ester of vegetable oils. An additional very particularly preferred embodiment are combinations in amounts of from 30 to 90% by weight of at least one alkanol alkoxylate of the formula (II) with from 70 to 10% by weight of at least one aliphatic $C_6$-$C_{18}$ alcohol.

An aqueous dispersion according to the invention is prepared by
(i) providing an aqueous dispersion comprising microcapsules, the capsule wall of which is formed from radically polymerized monomers and the capsule core of which comprises at least one oil and at least one lipophilic surfactant (microcapsule crude dispersion),
(ii) mixing with at least one agrochemical.

The microcapsule crude dispersion is preferably prepared by heating an aqueous emulsion comprising radically polymerizable monomers, lipophilic surfactant and oil. Depending on the oil used and the lipophilic surfactant, the aqueous emulsion is already formed at ambient temperature or only on heating. In a preferred embodiment, the aqueous emulsion comprises radically polymerizable monomers, radical initiator, protective colloid, lipophilic surfactant and oil.

Generally, an aqueous emulsion, comprising radically polymerizable monomers, lipophilic surfactant and oil, is first provided and subsequently the aqueous emulsion is heated. In a preferred embodiment, the aqueous phase of the emulsion, comprising protective colloid, and the oily phase of the emulsion, comprising lipophilic surfactant, oil and at least one monomer, are prepared separately and then the two phases are emulsified. Preferably, the emulsifying conditions for the preparation of the stable aqueous emulsion are chosen in a way known per se so that the oil droplets have the size of the desired microcapsules. Generally, the microcapsules are smaller the more energy is introduced into the reaction charge via shear force and stirring rate.

The polymerization of the monomers is initiated by heating. The polymerization can, if appropriate, be controlled through additional increase in temperature, the polymers produced forming the capsule wall which encloses the capsule core. This general principle is described, for example, in WO 03/0166050, on p. 7, l. 17 to p. 8, l. 8, to the content of which reference is expressly made. Generally, during the polymerization, less energy is introduced than during the emulsification. Preferably, for this, the stirring rate is reduced and/or another type of stirrer is used.

Generally, the polymerization is carried out at temperatures of from 20 to 150° C., preferably from 40 to 120° C. and especially from 60 to 95° C. Preferably, the heating is carried out stepwise. Naturally, the dispersing and preferably also the polymerization temperature should lie above the melting point of the mixture of oil and lipophilic surfactant.

Depending on the oil desired and the lipophilic surfactant, the emulsion can generally be formed at a temperature at which the core material is liquid or oily. Accordingly, a radical initiator should be chosen having a decomposition temperature above this temperature. Accordingly, the polymerization likewise should be carried out from 2° C. to 50° C. above this temperature, so that, if appropriate, radical initiators are chosen having a decomposition temperature lying above the melting point of the mixture of oil and lipophilic surfactant.

A common version of the process for oils with a melting point up to approximately 60° C. is a reaction temperature beginning at 60° C. which is increased to 85° C. in the course of the reaction. Advantageous radical initiators have a 10-hour half life in the range from 45 to 65° C., such as, for example, t-butyl perpivalate or dilauroyl peroxide. Additional radical initiators are described below.

According to an additional version of the process for oils with a melting point of greater than 60° C., a temperature program is chosen which starts at appropriately relatively high reaction temperatures. For starting temperatures of approximately 85° C., preference is given to radical initiators with a 10-hour half life in the range from 70 to 90° C., such as t-butyl per-2-ethylhexanoate. Additional radical initiators are described below.

Advantageously, the polymerization is carried out at standard pressure. However, it can also be operated under reduced or slightly elevated pressure, e.g. at a polymerization temperature of greater than 100° C., thus approximately in the region from 0.5 to 10 bar.

The reaction times for the polymerization are normally from 1 to 10 hours generally from 2 to 5 hours.

A version of the process using polyvinyl alcohol and/or partially hydrolyzed polyvinyl acetate as protective colloid makes possible an advantageous method according to which dispersion and polymerization take place directly at elevated temperature.

Subsequent to the actual polymerization reaction, with a conversion of from 90 to 99% by weight, it is generally advantageous to largely free the aqueous dispersion from odor carriers, such as residual monomers and other volatile organic constituents. In a way known per se, this can be achieved physically by distillative removal (in particular via steam distillation) or by stripping with an inert gas. Furthermore, it can take place chemically, advantageously by redox initiated polymerization, for example with combinations of at least one water-soluble peroxide, such as tert-butyl hydroperoxide, with ascorbic acid.

Generally, the microcapsule crude dispersion is prepared in the presence of at least one organic or inorganic protective colloid. Both organic and inorganic protective colloids can be ionic or neutral. Protective colloids can in this connection be used both individually and in mixtures of several protective colloids with identical or different charges.

Preferred organic protective colloids are water-soluble polymers. Particular preference is given to organic protective colloids which reduce the surface tension of the water from 73 mN/m maximum to from 45 to 70 mN/m and accordingly promote the formation of closed capsule walls, and also form microcapsules with preferred particle sizes.

Neutral organic protective colloids are, for example, cellulose derivatives, such as hydroxyethylcellulose, methylhydroxyethylcellulose, methylcellulose and carboxymethylcellulose, polyvinylpyrrolidone, vinylpyrrolidone copolymers, gelatin, gum arabic, xanthan gum, casein, polyethylene glycol, polyvinyl alcohol and partially hydrolyzed polyvinyl acetates, and methylhydroxypropylcellulose.

Polyvinyl alcohol can be obtained by polymerization of vinyl acetate, if appropriate in the presence of comonomers, and hydrolysis of the polyvinyl acetate with cleavage of acetyl groups with formation of hydroxyl groups. The degree of hydrolysis of the polymers can, for example, be from 1 to 100% and preferably lies in the range from 50 to 100%, in particular from 65 to 95%. The term "partially hydrolyzed polyvinyl acetates" is understood to mean, in the context of this patent application, a degree of hydrolysis of less than 50% and the term "polyvinyl alcohol" is understood to mean a degree of hydrolysis of at least from 50 to 100%.

Preference is given to polyvinyl alcohols or partially hydrolyzed polyvinyl acetates, the viscosity of a 4% by weight aqueous solution of which exhibits, at 20° C. according to DIN 53015, a value in the range from 3 to 56 mPa·s, preferably a value from 14 to 45 mPa·s. Preference is given to polyvinyl alcohols with a degree of hydrolysis of at least 65%, preferably at least 70%, in particular at least 75%.

Anionic organic protective colloids are, for example, sodium alginate, polymethacrylic acid and its copolymers, and the copolymers of sulfoethyl acrylate, sulfoethyl methacrylate, sulfopropyl acrylate, sulfopropyl methacrylate, N-(sulfoethyl)maleimide, 2-acrylamido-2-alkylsulfonic acid, styrenesulfonic acid and vinylsulfonic acid. Preferred anionic organic protective colloids are naphthalenesulfonic acid and naphthalenesulfonic acid/formaldehyde condensates and also, in particular, polyacrylic acids and phenolsulfonic acid/formaldehyde condensates.

Mention may be made, as inorganic protective colloids, of "pickering systems", which make possible stabilization by very fine solid particles and are insoluble but dispersible in water or are insoluble and nondispersible in water but wettable by the lipophilic substance.

A pickering system can in this connection consist of solid particles alone or additionally of auxiliaries which improve the dispersibility of the particles in water or the wettability of the particles by the lipophilic phase.

The solid inorganic particles can be metal salts, such as salts, oxides and hydroxides of calcium, magnesium, iron, zinc, nickel, titanium, aluminum, silicon, barium or manganese. Mention may be made of magnesium hydroxide, magnesium carbonate, magnesium oxide, calcium oxalate, calcium carbonate, barium carbonate, barium sulfate, titanium dioxide, aluminum oxide, aluminum hydroxide and zinc sulfide. Silicates, bentonite, hydroxyapatite and hydrotalcite may likewise be mentioned. Particular preference is given to highly dispersed silicas, magnesium pyrophosphate or tricalcium phosphate.

The highly dispersed silicas can be dispersed as fine solid particles in water. However, it is also possible to use what are known as colloidal dispersions of silica in water, also described as silica sols. Such colloidal dispersions are alkaline aqueous mixtures of silica. In the alkaline pH region, the particles are swollen up and stable in water. For use of these dispersions as pickering system, it is advantageous for the pH of the oil-in-water emulsion to be adjusted with an acid to a pH of from 2 to 7.

According to one embodiment, inorganic protective colloids and their mixtures with organic protective colloids are preferred.

According to an additional embodiment, neutral organic protective colloids are preferred. Preference is given to protective colloids carrying OH groups, such as polyvinyl alcohols, partially hydrolyzed polyvinyl acetates and methylhydroxypropylcellulose. Particular preference is given to mixtures of at least two neutral protective colloids, in particular of at least two protective colloids carrying OH groups. Very particularly preferred are mixtures of polyvinyl alcohol and methylhydroxypropylcellulose.

Generally, the protective colloids are used in amounts of from 0.1 to 15% by weight, preferably from 0.5 to 10% by weight, based on the aqueous phase. For inorganic protective colloids, mixtures of from 0.1 to 15% by weight, preferably from 0.5 to 10% by weight, based on the aqueous phase, are preferably chosen in this connection.

Preference is given to organic protective colloids in amounts of from 0.1 to 15% by weight, preferably from 0.5 to 10% by weight, based on the aqueous phase of the emulsion. According to a specific embodiment, preference is given to from 0.1 to 15% by weight, preferably from 0.5 to 10% by weight, of neutral organic protective colloids. Particular preference is given in this connection to from 0.1 to 15% by weight, preferably from 0.5 to 10% by weight, of protective colloids carrying OH groups, such as polyvinyl alcohols, partially hydrolyzed polyvinyl acetates and methylhydroxypropylcellulose.

Depending on the preparation process and the protective colloid or protective colloids chosen in this connection, this can likewise be a constituent of the microcapsules. Thus, up to 10% by weight, based on the total weight of the microcapsules, can be protective colloid. According to this embodiment, the microcapsules exhibit, on the surface of the polymer, the protective colloid or protective colloids.

Conventional additives can optionally be added in the preparation process. Low-molecular-weight anionic surfactants, for example sodium lauryl sulfate or sodium lauryl ether sulfate, are preferably added as additive.

Use may be made, as radical initiator for the polymerization reaction which proceeds under radical conditions, of the usual peroxo and azo compounds, advantageously in amounts of from 0.2 to 5% by weight, based on the weight of the monomers. Depending on the aggregate condition of the radical initiator and its solubility behavior, it can be introduced as such but preferably as a solution, emulsion or suspension, whereby in particular small amounts of radical initiator can be metered in with greater accuracy.

Mention may be made, as preferred radical initiators, of tert-butyl peroxyneodecanoate, tert-amyl peroxypivalate, dilauroyl peroxide, tert-amyl peroxy-2-ethylhexanoate, 2,2'-azobis(2,4-dimethylvaleronitrile), 2,2'-azobis(2-methylbutyronitrile), dibenzoyl peroxide, tert-butyl per-2-ethylhexanoate, di(tert-butyl)peroxide, tert-butyl hydroperoxide, 2,5-dimethyl-2,5-di(tert-butylperoxy)hexane and cumene hydroperoxide. Particularly preferred radical initiators are di(3,5,5-trimethylhexanoyl)peroxide, 4,4'-azobisisobutyronitrile, tert-butyl perpivalate, dilauroyl peroxide and dimethyl 2,2-azobisisobutyrate. These exhibit a half life of 10 hours in a temperature range from 30 to 100° C.

Furthermore, it is possible to add, for the polymerization, conventional amounts of modifiers known to a person skilled in the art, such as tert-dodecyl mercaptan or ethylhexyl thioglycolate.

An aqueous dispersion comprising microcapsules, the capsule wall of which is formed from radically polymerized monomers and the capsule core of which comprises at least one oil and at least one lipophilic surfactant (microcapsule crude dispersion), is used for the preparation of an aqueous dispersion according to the invention.

The microcapsule crude dispersion can, after the preparation, be preferably directly processed. The solids content is generally from 5 to 80% by weight, preferably from 20 to 60% by weight. The microcapsule crude dispersion can also be concentrated, by partially freeing it, if appropriate, from the liquid phase, before it is mixed with an agrochemical.

The microcapsule crude dispersion is mixed with at least one agrochemical. Suitable agrochemicals are mentioned below. Preference is given to mixing the microcapsule crude dispersion with an aqueous composition comprising at least one liquid and/or solid agrochemical. Particular preference is given to mixing it with an aqueous composition comprising at least one, in particular one, solid agrochemical. If the microcapsule crude dispersion is mixed with a solid agrochemical, the continuous phase usually comprises the agrochemicals in the form of suspended particles. The ratios by weight can in this connection vary within a wide range. Generally, the components are used in such ratios by weight that, for 1 part by weight of agrochemical, from 0.1 to 5 parts by weight, preferably from 0.4 to 2 parts by weight, of the combined amount of oil and lipophilic surfactant are present in microencapsulated form. In a preferred embodiment, the components are used in such ratios by weight that, for 1 part by weight of agrochemical, from 0.1 to 5 parts by weight, preferably from 0.4 to 2 parts by weight, of lipophilic surfactant are present in microencapsulated form.

In a specific embodiment, the aqueous dispersions according to the invention are "suspension concentrates" comprising microcapsules, at least one plant protection agent in the form of suspended particles and, if appropriate, additional formulation auxiliaries. Examples of such formulation auxiliaries are antifreeze agents, colorants, thickening agents, wetting agents or dispersing agents.

The aqueous dispersion according to the invention comprising microcapsules can, before application, also be diluted with water in amounts normal for agriculture.

The aqueous dispersion of the microcapsules according to the invention can generally release the capsule content, comprising oil and lipophilic surfactant, on drying. A possible explanation (without being committed thereto) is that the microcapsule walls are hydrated in aqueous solution and thus water and protective colloid accumulate on the outside of the capsule wall. This type of "second envelope" would be very polar and would prevent the oil and lipophilic surfactant from diffusing from the capsule core towards the outside. On drying the dispersion, the "second envelope" would be destroyed and accordingly the very polar diffusion barrier would be lost. Oil and lipophilic surfactant could now diffuse more readily into and through the capsule wall. The lipophilic surfactant diffusing into the capsule wall could act as plasticizer and contribute to destabilizing the capsule wall.

The aqueous dispersion according to the invention comprising microcapsules can be used for those industrial uses in which the capsule content is released on drying an aqueous dispersion of microcapsules. The drying of an aqueous dispersion generally takes place by evaporation of the aqueous constituent of the applied dispersion. Drying can, for example, take place in the open countryside at temperatures from −20 to +100° C., preferably at 0 to 40° C., at normal atmospheric pressure and atmospheric humidity, for example of at most 95%, preferably of at most 80%. It is also possible to accelerate the drying under artificial conditions with high temperatures or reduced atmospheric pressure.

The invention also relates to a product comprising, as separate components, a microcapsule crude dispersion and at least one agrochemical for combined use in the combating of undesirable plant growth and/or for combating undesirable insect or acarid infestation on plants and/or for combating phytopathogenic fungi. The product preferably comprises, as separate components, a microcapsule crude dispersion and at least one, preferably one, agrochemical. The separate components can be mixed before use or can be used separately divided by steps in time, preferably within 48 h, particularly within 24 h and especially within 8 h. The separate components are preferably mixed before use.

The invention also relates to a method for combating undesirable plant growth and/or for combating undesirable insect or acarid infestation on plants and/or for combating phytopathogenic fungi, in which seeds of useful plants are treated with an aqueous dispersion according to the invention or an aqueous dispersion prepared according to a process according to the invention. An additional embodiment is the use in combating undesirable plant growth and/or in combating undesirable insect or acarid infestation on plants and/or in combating phytopathogenic fungi, wherein seeds of useful plants are treated with an aqueous dispersion according to the invention or an aqueous dispersion prepared according to a process according to the invention.

In addition, the invention relates to a method for combating undesirable plant growth and/or for combating undesirable insect or acarid infestation on plants and/or for combating phytopathogenic fungi, in which the fungi/insects, their habitat or the plants or soil to be protected from fungal or insect infestation, or the undesirable plants, the soil in which the undesirable plants grow or their seeds, are treated with an aqueous dispersion according to the invention or an aqueous dispersion prepared according to a process according to the invention. An additional embodiment is the use in combating undesirable plant growth and/or in combating undesirable insect or acarid infestation on plants and/or in combating phytopathogenic fungi, in which the fungi/insects, their habitat or the plants or soil to be protected from fungal or insect infestation, or the undesirable plants, the soil in which the undesirable plants grow or their seeds, are treated with an aqueous dispersion according to the invention or an aqueous dispersion prepared according to a process according to the invention.

The treatment of the abovementioned fungi, insects, plants and/or their habitats preferably takes place by application of the aqueous dispersion of microcapsules according to the invention. The application is preferably carried out by spraying.

The term "agrochemicals" is understood to mean plant protection agents and fertilizers. Suitable plant protection agents are acaricides, algicides, aphicides, bactericides, fungicides, herbicides, insecticides, molluscicides, nematicides, germination inhibitors, safeners or growth regulators. Examples of fertilizers are inorganic single- or multinutrient fertilizers, organic and organic/inorganic fertilizers or fertilizers with trace elements. Preferred agrochemicals are plant protection agents.

Fungicides are compounds which destroy fungi and their spores or inhibit their growth. Examples of suitable fungicides are strobilurins, carboxamides, azoles, nitrogen-comprising heterocyclyl compounds, carbamates and dithiocarbamates, and other fungicides, such as guanidines, antibiotics, organometallic compounds, sulfur-comprising heterocyclyl compounds, organophosphorus compounds, organochlorine compounds, nitrophenyl derivatives or inorganic active compounds.

Insecticides are compounds which, in their effect, are directed in particular against insects and their developmental forms. Examples of suitable insecticides are organo(thio)phosphates, carbamates, pyrethroids, growth regulators, nicotin receptor agonists/antagonists, GABA antagonists, macrolides, METI I compounds, METI II and III compounds, uncoupling compounds, inhibitors of oxidative phosphorylation, molting disruptors, inhibitors of mixed-function oxidase or sodium channel blockers.

The term "herbicides" is understood to mean compounds which are active against generally wild and crop plants which are undesirable at their respective location (harmful plants). Examples of suitable herbicides are lipid biosynthesis inhibitors, ALS inhibitors, photosynthesis inhibitors, protoporphyrinogen IX oxidase inhibitors, bleaching herbicides, EPSP synthase inhibitors, glutamine synthase inhibitors, DHP synthase inhibitors, mitosis inhibitors, VLCFA inhibitors, cellulose biosynthesis inhibitors, uncoupling herbicides, auxin herbicides, auxin transport inhibitors or safener herbicides.

Altogether, the aqueous dispersions comprising microcapsules according to the invention have many advantages in comparison with conventional dispersions with microcapsules: the microcapsules in the aqueous dispersion according to the invention release, on drying an aqueous dispersion of the abovementioned microcapsules, the content of the capsule core. The microcapsules are suitable for agrochemical use and can comprise and rerelease penetration-promoting compounds, such as oil or lipophilic surfactant. With the help of the microcapsules, suspension concentrates of plant protection agents comprising penetration-promoting compounds, such as oil and/or lipophilic surfactant, could be provided in which the crystallization of the plant protection agents is reduced. With the help of the microcapsules, suspension concentrates of plant protection agents could be provided which showed an increased biological activity in comparison with conventional suspension concentrates without adjuvant. Use is made, in preparing the microcapsules, of isocyanates, which are toxic and highly reactive with regard to other materials used.

The following examples illustrate the invention without limiting it.

EXAMPLES

Materials used:
Oil 1: Technical aromatic mixture with a boiling-point range from 235 to 290° C., a pour point of less than −5° C. and an aniline point of 12° C.
Oil 2: Refined soybean oil.
Oil 3: Dodecanol.
Oil 4: High-pressure hydrogenated mineral oil with a viscosity of approximately 68 mm$^2$/s at 40° C. and a pour point of −21° C.
Oil 5: Corn oil.
Surfactant 1: $C_{16}/C_{18}$-fatty alcohol alkoxylate with on average 2 to 7 ethylene oxide units and 5 to 15 propylene oxide units.
Surfactant 2: $C_{13}$-Alcohol alkoxylate with on average 2 to 7 ethylene oxide units and 1-5 propylene oxide units.
Surfactant 3: $C_{13}$-Alcohol alkoxylate with on average 5 to 8 ethylene oxide units.
Surfactant 4: $C_{13}/C_{15}$-Alcohol alkoxylate with on average 3 to 5 ethylene oxide units and a butylene oxide unit, methylated.
Protective colloid 1: Methylhydroxypropylcellulose (with a Brookfield viscosity (at 20° C., 20 rpm, 2% by weight) of 90-125 mPa·s), 5% by weight solution in water.
Protective colloid 2: Polyvinyl alcohol solution: 10% by weight in water, degree of hydrolysis 79%, mean degree of polymerization PW: 1900
MMA: Methyl methacrylate
MAA: Methacrylic acid
BDA2: 1,4-Butanediol diacrylate Example 1

The aqueous phase and the oily phase were first prepared separately with the following compositions:

| Aqueous phase: |
|---|
| 240.0 g water |
| 95.0 g protective colloid 1 |
| 23.8 g protective colloid 2 |
| 1.1 g of a 2.5% by weight aqueous sodium nitrite solution |
| Oily phase: |
| 132 g surfactant 1 |
| 88 g oil 1 |
| 8.6 g methyl methacrylate |
| 3.7 g methacrylic acid |
| 0.35 g of a 75% solution of tert-butyl perpivalate in aliphatic hydrocarbons |
| Feed 1: |
| 2.69 g of a 10% by weight aqueous tert-butyl hydroperoxide solution |
| Feed 2: |
| 14.15 g of a 1% aqueous ascorbic acid solution |

The aqueous phase was introduced at ambient temperature. After addition of the oily phase, dispersing was carried out for 40 minutes with a dissolver stirrer at 3500 rpm. The resulting emulsion was heated, while stirring with an anchor stirrer, to 70° C. in 60 minutes and 85° C. within an additional 60 minutes and was maintained at 85° C. for an hour. Feed 1 was added with stirring to the microcapsule dispersion produced. Feed 2 was metered in in 90 minutes and with stirring, in the course of which the dispersion was cooled to ambient temperature. The microcapsule dispersion produced had a solids content of 40% and a mean particle size of 2.45 μm (measured with Fraunhofer diffraction, mean value by volume).

Example 2

The aqueous phase and the oily phase were first prepared separately with the following compositions:

| Aqueous phase: |
| --- |
| 240.0 g water |
| 95.0 g protective colloid 1 |
| 23.8 g protective colloid 2 |
| 2.04 g of an aqueous 15% by weight sodium lauryl sulfate solution |
| 1.1 g of a 2.5% by weight aqueous sodium nitrite solution |
| Oily phase: |
| 132 g surfactant 1 |
| 88 g oil 2 |
| 17.1 g methyl methacrylate |
| 7.4 g methacrylic acid |
| 0.35 g of a 75% solution of tert-butyl perpivalate in aliphatic hydrocarbons |
| Feed 1: |
| 2.69 g of a 10% by weight aqueous tert-butyl hydroperoxide solution |
| Feed 2: |
| 14.15 g of a 1% aqueous ascorbic acid solution |

The aqueous phase was introduced at ambient temperature. After addition of the oily phase, dispersing was carried out for 40 minutes with a dissolver stirrer at 3500 rpm. The emulsion obtained was heated, while stirring with an anchor stirrer, to 70° C. in 60 minutes and 85° C. within an additional 60 minutes and was maintained at 85° C. for an hour. Feed 1 was added with stirring to the microcapsule dispersion produced. Feed 2 was metered in in 90 minutes and with stirring, in the course of which the dispersion was cooled to ambient temperature. The microcapsule dispersion produced had a solids content of 40.6% and a mean particle size of 2.68 μm (measured with Fraunhofer diffraction, mean value by volume).

Example 3

The aqueous phase and the oily phase were first prepared separately with the following compositions:

| Aqueous phase: |
| --- |
| 240.0 g water |
| 95.0 g protective colloid 1 |
| 23.8 g protective colloid 2 |
| 2.04 g of an aqueous 15% sodium lauryl sulfate solution |
| 1.1 g of a 2.5% by weight aqueous sodium nitrite solution |
| Oily phase: |
| 132 g surfactant 2 |
| 88 g oil 3 |
| 17.1 g methyl methacrylate |
| 7.4 g methacrylic acid |
| 0.35 g of a 75% solution of tert-butyl perpivalate in aliphatic hydrocarbons |
| Feed 1: |
| 2.69 g of a 10% by weight aqueous tert-butyl hydroperoxide solution |
| Feed 2: |
| 14.15 g of a 1% aqueous ascorbic acid solution |

The aqueous phase was introduced at 60° C. The oil phase was heated to 60° C., added and dispersed for 40 minutes at 60° C. with a dissolver stirrer at 3500 rpm. After addition of the radical initiator, the emulsion was heated, while stirring with an anchor stirrer, to 85° C. in 60 minutes and was maintained at 85° C. for two hours. Feed 1 was added with stirring to the microcapsule dispersion produced. Feed 2 was added with metering over 90 minutes and with stirring, in the course of which the dispersion was cooled to ambient temperature. The microcapsule dispersion produced had a solids content of 40.5% and a mean particle size of 24.9 μm (measured with Fraunhofer diffraction, mean value by volume).

Examples 4-7

Example 4 was carried out analogously to example 1.
Examples 5 and 6 were carried out analogously to example 2.
Example 7 was carried out analogously to example 3.
The details for examples 4-7 are combined in table 1.

Example 8

Stability of the Formulation 295 g of a suspension concentrate (SC) of dimoxystrobin (500 g/l) and 118 g of a suspension concentrate of epoxiconazole (500 g/l) were added to a metal beaker with a propeller stirrer. 489.2 g of the dispersion from example 2 were added while stirring at 2000 rpm and the mixture was stirred for 10 minutes.

The test specimens were stored at 40 or 50° C. for 12 weeks and the particle sizes were determined after 10 min (start), after 2 weeks and after 12 weeks. In parallel with this, a test specimen was prepared which comprised the unencapsulated lipophilic surfactant 1 at the same concentration as in example 2 and a test specimen was prepared without lipophilic surfactant 1. The particle sizes of the test specimens were determined using a Malvern Mastersizer 2000 and are represented in table 2. The particle size is given as D (v, 50%) value, which represents as mean diameter of 50% of the particles (type of distribution: volume).

The experiment shows that the encapsulation of the surfactant results in a more stable formulation, in comparison with a formulation in which the surfactant is not encapsulated.

TABLE 2

| | Particle sizes [μm] | | | | |
| --- | --- | --- | --- | --- | --- |
| Test specimen | Start | 2 weeks, 40° C. | 2 weeks, 50° C. | 12 weeks, 40° C. | 12 weeks, 50° C. |
| Without surfactant 1[1] | 1.4 | 1.4 | 1.5 | 1.6 | 1.6 |
| Unencapsulated surfactant 1[1] | 2.0 | 2.3 | 2.5 | 2.5 | 3.0 |
| Encapsulated surfactant 1 (example 2) | 1.9 | 2.2 | 2.1 | 2.3 | 2.1 |

[1]not according to the invention

Example 9

Biological Effect

Experiments on determining the plant protection effect were undertaken with the lipophilic surfactant encapsulated according to the invention. For this, the test specimens of the encapsulated lipophilic surfactants from example 1, 3, 5 or 6 were mixed with a suspension concentrate (SC) of epoxiconazole (500 g/l), so that there were two parts by weight of lipophilic surfactant to one part by weight of active compound. These mixtures were applied by spraying in concentrations of 50, 25 and 12.5 ppm to wheat plants affected by wheat leaf rust. The nonencapsulated surfactant and the SC formulation without surfactant were tested each time as comparison. The infestation of the plants without addition of plant protection agent was 80%.

For the evaluation, the percentage infestation of the plants was examined after 8 days. The results of the experiments are reproduced in table 3.

TABLE 3

| Treatment with surfactant | Infestation of the plants [%] 50 ppm[2)] | 25 ppm[2)] | 12.5 ppm[2)] |
|---|---|---|---|
| Without surfactant[1)] | 25 | 37 | 57 |
| Surfactant 1, unencapsulated[1)] | 3 | 4 | 37 |
| Surfactant 1 (example 1) | 2 | 3 | 35 |
| Surfactant 2, unencapsulated[1)] | 1 | 9 | 40 |
| Surfactant 2 (example 3) | 2 | 12 | 43 |
| Surfactant 3, unencapsulated[1)] | 5 | 11 | 29 |
| Surfactant 3 (example 5) | 6 | 16 | 33 |
| Surfactant 4, unencapsulated[1)] | 3 | 7 | 47 |
| Surfactant 4 (example 6) | 5 | 10 | 42 |

[1)]not according to the invention
[2)]concentration of epoxiconazole in the applied formulation and wherein the continuous phase comprises at least one agrochemical.

2. The aqueous dispersion according to claim 1, in which the capsule core comprises more than 25% by weight of the at least one lipophilic surfactant and less than 90% by weight of the at least one oil, in each case based on the weight of the capsule core.

3. The aqueous dispersion according to claim 1, wherein the at least one agrochemical is in the form of suspended particles.

4. The aqueous dispersion according to claim 1, in which the monomers are acrylic acid and its esters, methacrylic acid and its esters, maleic acid and its esters, styrene, butadiene, isoprene, vinyl acetate or vinyl propionate.

5. The aqueous dispersion according to claim 1, in which the capsule wall is formed from 30 to 100% by weight of one or more monomers I selected from the group consisting of $C_1$-$C_{24}$-alkyl esters of acrylic acid, $C_1$-$C_{24}$-alkyl esters of methacrylic acid, acrylic acid, methacrylic acid, methacrylic anhydride and maleic acid, 0 to 20% by weight of one or more bi- and/or polyfunctional monomers II which are insoluble or sparingly soluble in water, and 0 to 50% by weight of one or more monomers III, in each case based on the total weight of the monomers I, II, and III.

6. A process for the preparation of an aqueous dispersion according to claim 1 comprising:

(i) providing a microcapsule crude dispersion comprising microcapsules, wherein the microcapsules comprise a capsule wall which is formed from radically polymerized monomers and a capsule core which comprises at least one oil and at least one lipophilic surfactant, and

TABLE 1

| Example No. | Surfactant | Oil | Lipophilic surfactant/ oil 1[a)] | Monomers | Ratio by weight of the monomers | Core/Wall[b)] | Solids content (% by weight) | Mean particle size [μm] |
|---|---|---|---|---|---|---|---|---|
| 4 | Surfactant 1 | Oil 4 | 60/40 | MMA/MAA | 70/30 | 90/10 | 40.5 | 20.5 |
| 5 | Surfactant 3 | Oil 5 | 60/40 | MMA/MAA | 70/30 | 90/10 | 40.6 | 77.2 |
| 6 | Surfactant 4 | Oil 5 | 60/40 | MMA/MAA | 70/30 | 90/10 | 40. | 5.9 |
| 7 | Surfactant 2 | Oil 3 | 40/60 | MMA/MAA/BDA2 | 60/30/10 | 90/10 | 40.6 | 2.6 |

[a)]Ratio by weight
[b)]The core/wall ratio by weight refers to the ratio of the sum of oil and lipophilic surfactant to the sum of the monomers

The invention claimed is:

1. An aqueous dispersion comprising microcapsules and a continuous phase, wherein the microcapsules comprise a capsule wall which is formed from radically polymerized monomers and a capsule core which comprises at least one oil and at least one lipophilic surfactant, wherein the capsule core comprises more than 20 wt % of the at least one lipophilic surfactant comprising at least one alkanol alkoxylate of the formula (I)

$$R^a—O-(AO)_m—R^1$$

wherein $R^a$ is a straight-chain or branched alkyl or alkylene with from 4 to 32 carbon atoms, AO is an ethylene oxide radical, propylene oxide radical, butylene oxide radical, pentylene oxide radical, styrene oxide radical, or a mixture thereof in random or block sequence, m is from 1 to 30, and $R^1$ is hydrogen or alkyl with from 1 to 4 carbon atoms;

(ii) mixing the microcapsule crude dispersion with at least one agrochemical to prepare the aqueous dispersion, wherein the capsule core comprises more than 20 wt % of the at least one lipophilic surfactant comprising at least one alkanol alkoxylate of the formula (I)

$$R^a—O-(AO)_m—R^1$$

wherein $R^a$ is a straight-chain or branched alkyl or alkylene with from 4 to 32 carbon atoms, AO is an ethylene oxide radical, propylene oxide radical, butylene oxide radical, pentylene oxide radical, styrene oxide radical, or a mixture thereof in random or block sequence, m is from 1 to 30, and $R^1$ is hydrogen or alkyl with from 1 to 4 carbon atoms.

7. The process according to claim 6, in which the microcapsule crude dispersion is prepared by heating an aqueous emulsion comprising radically polymerizable monomers, at least one lipophilic surfactant and oil.

8. The process according to claim 7, in which the aqueous emulsion comprises radically polymerizable monomers, radical initiator, protective colloid, lipophilic surfactant and oil.

9. A product comprising, as separate components,
a microcapsule crude dispersion comprising microcapsules, wherein the microcapsules comprise a capsule wall which is formed from radically polymerized monomers and a capsule core which comprises at least one oil and at least one lipophilic surfactant; and
at least one agrochemical,
for combined use in combating undesirable plant growth and/or for combating undesirable insect or acarid infestation on plants and/or for combating phytopathogenic fungi,
wherein the capsule core comprises more than 20 wt % of the at least one lipophilic surfactant comprising at least one alkanol alkoxylate of the formula (I)

$$R^a\text{—}O\text{-}(AO)_m\text{—}R^1$$

wherein
$R^a$ is a straight-chain or branched alkyl or alkylene with from 4 to 32 carbon atoms,
AO is an ethylene oxide radical, propylene oxide radical, butylene oxide radical, pentylene oxide radical, styrene oxide radical, or a mixture thereof in random or block sequence,
m is from 1 to 30, and
$R^1$ is hydrogen or alkyl with from 1 to 4 carbon atoms.

10. The aqueous dispersion of claim 1, wherein the at least one oil is an aliphatic compound, an aromatic compound, a wax, a vegetable oil, an ester of the vegetable oil, a silicone oil, an aliphatic $C_6$-$C_{18}$ alcohol, a fatty acid ester with from 8 to 40 carbon atoms in the acid portion and from 1 to 20 carbon atoms in the alcohol portion, ethylhexyl laurate, dibutyl succinate, dibutyl adipate, dibutyl phthalate, a dialkyl ester of the formula (V):

$$R^2\text{—}O(O)R^3(O)O\text{—}R^4$$

wherein
$R^2$ and $R^4$ are, independently of one another, an alkyl or alkylene with from 1 to 32, carbon atoms, and
$O(O)R^3(O)O$ is a dicarboxyl radical wherein $R^3$ comprises at least 3 carbon atoms, or a mixture thereof.

11. The aqueous dispersion of claim 1, wherein the weight ratio of the agrochemical to the combined amount of oil and lipophilic surfactant is from 1:0.1 to 1:5.

12. The aqueous dispersion of claim 1, wherein the capsule core is free of agrochemical.

* * * * *